United States Patent [19]

Itoh

[11] Patent Number: 5,274,813
[45] Date of Patent: Dec. 28, 1993

[54] OPERATION SYSTEM HAVING A MIGRATION FUNCTION WHICH MOVES SAVED DATA ASSOCIATED WITH AN INTERRUPTED PROCESS TO A DIFFERENT SAVE AREA

[75] Inventor: Satoshi Itoh, Kawasaki, Japan

[73] Assignee: Kabushiki Kaisha Toshiba, Kawasaki, Japan

[21] Appl. No.: 765,183

[22] Filed: Sep. 25, 1991

[30] Foreign Application Priority Data

Sep. 28, 1990 [JP] Japan ................. 2-259003

[51] Int. Cl.$^5$ .................. G06F 11/30; G06F 9/40
[52] U.S. Cl. .................. 395/700; 364/DIG. 1; 364/280.3; 364/280.8; 364/264.1
[58] Field of Search ............ 364/DIG.; 395/700, 725, 395/775

[56] References Cited

U.S. PATENT DOCUMENTS 4,847,749 7/1989 Collins et al. ................. 364/DIG. 1

OTHER PUBLICATIONS

H. W. Lynch et al, The OS/VS 2 Release 2 System Resources Manager, vol. 13, No. 4, pp. 274–291 (1974).

*Primary Examiner*—Thomas M. Heckler
*Attorney, Agent, or Firm*—Oblon, Spivak, McClelland, Maier & Neustadt

[57] ABSTRACT

A computer system having a CPU which executes instructions and uses resources of the computer system as the instructions are being executed. A monitoring device of the computer system monitors the quantity of resources used by the execution device and outputs a signal indicating that a limiting threshold of the use of the computer system resources has been approached, reached, or exceeded. Once the system resource limiting threshold has been reached, the executing process in the CPU is interrupted and data associated with the executing program is saved in a first save area. If a user of the computer system does not take any action after a predetermined period of time, the saved data associated with the executing program is moved to a second save area which has a slower access time than the first save area. After another predetermined period of time has elapsed without input from the user indicating a resume of the previously executing program, the saved data is further moved to a different storage area having a slower access time than the second storage area. The saved data is used to restart the execution of the instructions which have been interrupted, upon the input of a restart command from a user, so that the computer does not have to re-execute the previously executed instructions.

18 Claims, 3 Drawing Sheets

OPERATION SYSTEM HAVING A MIGRATION FUNCTION WHICH MOVES SAVED DATA ASSOCIATED WITH AN INTERRUPTED PROCESS TO A DIFFERENT SAVE AREA

BACKGROUND OF THE INVENTION

1. Field of the Invention

The present invention relates to an operation system (to be abbreviated to as an "OS" hereinafter) for a so-called "Neumann type (stored program)" computer for executing processing according to a program prepared by a user according to his or her problem and, more particularly, to an OS having a migration function for a computer, which allows efficient use of a computer system.

2. Description of the Related Art

A software program of a normal computer, in particular, of a main-frame type computer, is constituted by a user definition program used by a user to designate a processing sequence, and an OS for a system.

The user definition program (so-called a user program) is a program for mainly instructing a sequence of calculations (processing) according to an individual problem to a computer side. It is cumbersome to use computers if specifications of program languages are different from each other depending on the types of computer. Therefore, in recent years, the specifications of program languages have been standardized. For example, high-level languages such as FORTRAN, BASIC, ALGOL, C, PASCAL, COBOL, and the like are widely used.

In contrast to the program languages, since an OS is a system software group unique to each type of computer, it must provide a procedure system for compiling, linking and executing user programs (i.e. user definition programs) coded in a high-level language, and a multi-process environment (e.g. real-time multi-task processing system) in a normal computer. Therefore, the OS has a control system for performing management and scheduling of individual jobs, and management and monitoring of resources, and providing a user environment (e.g., utilities, etc.), and performs all the tasks necessary for operating the computer.

OSs of computers are not basically standardized at the present time, and are different in each type of computer. However, a tendency for standardizing OSs has been shown. In general-purpose computers, UNIX is substantially regarded as a standard OS. In small computers, MS-DOS is similarly regarded as a standard OS. In very recent years, MACH as a development type of the above-mentioned UNIX, OS/2 as a development type of the above-mentioned MS-DOS, and the like have been proposed, and computers packaging these OSs are commercially available.

Important tasks to be executed by an OS include "management" and "monitoring" of resources. In general, the "resources" represent hardware (mainly, memory units, e.g., a main memory area, a semiconductor memory device, a magnetic memory device, etc. as external memory devices) which can be used by a job, and system software (e.g., a compiler for compiling a program coded in a high-level language, a linker, a loader, various utilities provided by a system, general-purpose software programs, and the like).

How much these resources are used depends on the content of a user program to be executed. Some computers give resources requested by a user program as much as possible without limitations. However, in a computer such as a general-purpose large-scale computer which executes processing of jobs of a large number of users in a "multi-task system", predetermined default values (i.e., predetermined system values) are determined beforehand for computer resources which are given independently of programs designated by users in consideration of operating efficiency and resource efficiency of the overall system. Thus, wasteful calculations and continuous execution of an infinite arithmetic loop (so-called a permanent loop) which can never be logically or practically ended, particularly caused by errors in a user definition program, can be avoided. However, some jobs cannot be executed by the above-mentioned method. In this case, a user must analyze a cause of abnormal termination, must properly change upper limit values of useable resources (e.g., a memory capacity, time), and thereafter, must re-execute the job from the beginning.

In a large-scale general-purpose computer, limitations of resources used by a job can be desirably designated in a specification (e.g. syntax) of a "job control language (to be abbreviated to as a "JCL" hereinafter)". For example, the resources include the upper limit value of the capacity of a main memory (e.g., a user memory size, etc.) which must be used by a job, the upper limit value of the CPU occupation time, and the like. However, it is very difficult to precisely obtain estimation values of resources necessary for actual processing. For example, in an actual operation, execution of a job is often interrupted during processing since no resources remain, although processing would be ended soon to obtain a processing result. For a small job (which requires short processing time), the upper limit values of useable computer resources can be set again to be larger values, and the job can be re-executed. However, for a large job (which requires long processing time), the above-mentioned re-execution processing considerably wastes CPU time and memory resources. Conventional computers disregard the above-mentioned problems.

During a development process of a large-scale program, test data are prepared. More specifically, test data which are used as actual data to immediately complete calculations, and allow to easily check whether or not the execution result is proper are prepared, thereby checking whether or not a program is normally operated. Therefore, a main memory capacity, a magnetic memory capacity, and the like (i.e., a program size) required by the program can be determined after the test calculations using the above-mentioned test data. On the other hand, in a test case, since processing is immediately completed (due to a small number of data), a predicted calculation (processing) time obtained as a result of the test case cannot be used as a reference time. In a processing method adopted in scientific and technical calculations, calculations are frequently repeated and are terminated only after the calculated value converges to a required precision. However, in such a processing method, it is almost impossible to experimentally estimate a calculation time (i.e. CPU occupation time). In particular, in large-scale calculation processing, a slight underestimation result of the calculation time (i.e. CPU occupation time) often leads to considerable wastes upon execution of actual processing.

It is difficult to estimate not only the "calculation time (i.e. CPU occupation time)" of resources but also the "capacity" of a magnetic memory device. More specifically, in order to permanently store data in most of existing large-scale computers, after a data file is created on an external magnetic memory device, a memory area assigned to this file is utilized. When a user uses this magnetic memory device, he or she must designate a data capacity (e.g. size (MB)) in advance. In general, it is considered that the maximum capacity of a magnetic memory device is smaller than a physical memory space capacity, and is equal to the capacity of a logical memory space. When a user roughly estimates a data amount, he or she can calculate it based on the number of words, the word length, and the like. However, in particular, when the user is a beginner, he or she often fails to correctly estimate the data amount. As a result, even though actual calculation processing is completely ended, in "write processing" executed after the calculation processing is ended, i.e., when data are finally written in a logical file of the magnetic memory device in the magnetic memory device of the set capacity, a series of processing operations may be abnormally terminated since the data cannot be completely written within the available capacity.

In order to prevent such abnormal termination, recent computers are improved to be able to designate a "primary assignment amount (so called, primary quantity)" and an "increase amount (so called, secondary quantity)". The "primary quantity" is an amount required at the beginning of execution, and the "secondary quantity" is an amount increased after the primary quantity is used up. A permanent file capacity can be expanded by a predetermined number of times (e.g., 10 times) according to the increase amount. Even when the above-mentioned method is employed, the resources are sometimes used up, and write processing may often be unsuccessful.

In general, the resources are often used up from a viewpoint of a user. However, in this case, a computer system has not always really used up its resources (i.e., a memory capacity). Meanwhile, the CPU time is almost infinitely present on the computer side. More specifically, the computer still has a margin for a memory capacity. However, the computer has some limitations in consideration of multi-task operations. More specifically, these limitations are set to avoid a phenomenon that if an excessively large resource is assigned to one task, other tasks cannot be operated. However, if this job is abnormally terminated, it must be re-executed after the resource assignment amount is changed, and wasteful calculation processing must be executed again. In consideration of wastes caused by the above re-calculation processing, whether or not the above-mentioned limitations themselves are proper is doubtful in view of efficient utilization of the overall computer, and of improvement of the throughput of the overall computer (in a sense of obtaining a necessary result).

Some recent large-scale computers have job "restart" functions. However, these functions can only basically define post processing when a job is abnormally terminated. In most cases, only an operator of a computer is allowed to operate these functions, and no countermeasure against a case wherein resources are used up is particularly taken in the OS.

In general, to use resources beyond expectations is a miss for a user in a wide sense. The cause of such a miss is often merely an estimation error of the CPU time or memory capacity. Therefore, it is important for a user and a computer to consider such "harmless misses" separately from abnormal terminations.

As described above, in a conventional computer, when a resource amount set in advance by a user runs short, a corresponding job is interrupted during processing, and a result of calculation processing obtained so far is wasted. Thus, if a sufficient set amount of a resource is assured in advance, such a problem can be prevented. However, this setting may waste the finite resources. More specifically, in the conventional resource setting system, utilization efficiency of a computer is decreased.

SUMMARY OF THE INVENTION

It is an object of the present invention to provide an OS for a computer, which can re-execute a job from an interrupted point even after resources assigned to the job in advance are used up, and can improve utilization efficiency of a computer.

It is, therefore, another object of the present invention to constitute an OS which adopts processing for, when a given jog uses up resources, asking for decision of a user (i.e., inquiring to the user) without abnormally terminating the job to interrupt execution, thereby preventing resources (i.e., time, a storage medium, and the like) from being wasted by, e.g., re-calculation processing.

More specifically, according to the present invention, there is provided an OS for a computer, which compiles a program prepared by a user, and then executes a load module created by linking necessary modules, comprising means for monitoring an execution position of a user program, means for monitoring a value of a used resource of the computer, means for judging based on the monitoring results from these means whether the value (e.g., a required time or required capacity) of the used resource in use approaches a value a predetermined value to a designated upper limit value, or exceeds the upper limit value, means for, when the judging means judges that the value of the used resource approaches the value the predetermined value to the designated upper limit value exceeds the upper limit value, dumping contents of all registers and a status word register used to an external storage medium, temporarily terminating the processing (job), and informing to the user a message indicating that the resource is too small to execute the program, and means for, when the user performs a predetermined procedure, re-loading the already dumped contents, and allowing re-execution from an interrupted point, and more preferably, further comprising means for, when the user or an operator does not perform a predetermined procedure (e.g., does not change set values) within a predetermined term, automatically (i.e. without any user's interpose) deleting the dumped contents.

A hardware arrangement on which the OS of the present invention can operate is provided with at least two external storage media, and in addition to the above-mentioned arrangement, the OS of the present invention makes a full-dump output to a storage medium having the shortest access time when the contents of the load module, and all the registers and the status word register are dumped. However, when no instruction according to a predetermined procedure is performed after an elapse of predetermined time determined by this system, the dumped contents are migrated to a storage medium having the second shortest access time. However, when no predetermined instruction is issued at all while the dumped contents are present on the above storage medium, the dumped contents are migrated to a storage medium having the third shortest access time. Similarly, when no predetermined instruction is issued, the dumped contents are sequentially migrated to storage media requiring the next longer access times.

As described above, according to the present invention, when a resource in use approaches a predetermined value to the upper limit value or exceeds the upper limit value, processing is temporarily terminated, this state is informed to an operator, and thereafter, the system waits for an instruction from the operator. However, when no instruction is issued by an operator within a predetermined period of time, the contents of the load module, the contents of all the registers and the status word register are dumped to an external memory device. Thereafter, a user need only perform a predetermined procedure to instruct re-execution, so that the OS of the present invention reloads the dumped contents, and re-execute processing from an interrupted point. Therefore, unlike in a conventional system which re-starts calculation processing from the beginning, since a processing result up to an interruption timing can be utilized, utilization efficiency of a computer can be improved while eliminating a wasteful re-calculation (processing time). In addition, since an excessively large resource amount (in particular, a required memory capacity and a memory space) need not be set to decrease memory efficiency of the system, the resource can be effectively operated in an actually required amount. With this effect, utilization efficiency of a computer can also be improved (in terms of the time and memory space).

The OS of the present invention waits for a re-execution instruction while sequentially migrating the dumped contents to storage media having longer access times until an operator is ready. If the re-execution instruction is not issued within a predetermined period of time since the operator is not ready, the OS of the present invention finally automatically deletes the dumped contents, thus performing a delete operation which is apt to be forgotten by the operator, and contributing to effective use of storage media as resources.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
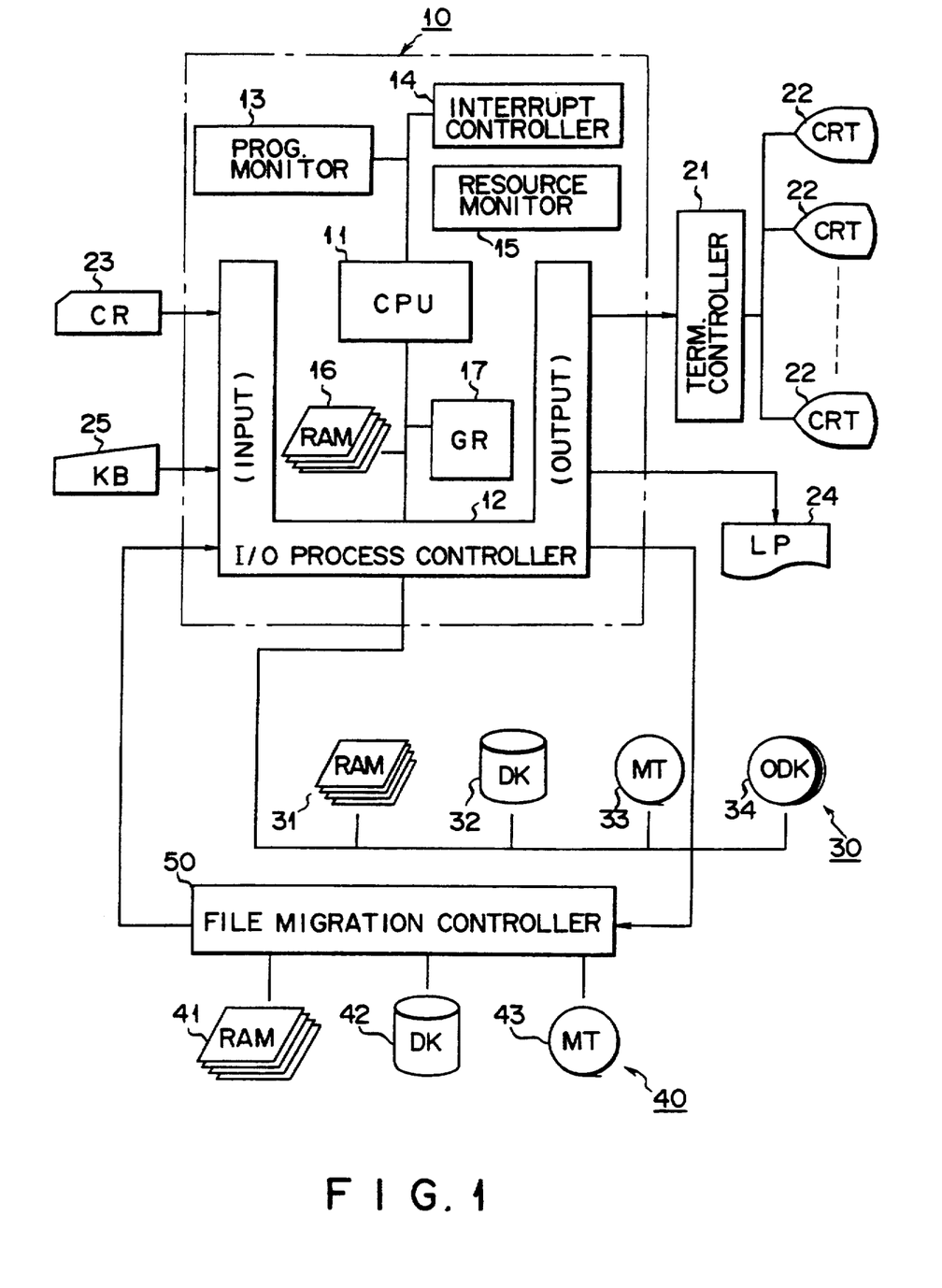
FIG. 1 is a block diagram of a computer system using an OS according to a embodiment of the present invention.

FIG. 1 is a block diagram showing an arrangement of a computer system using an OS according to an embodiment of the present invention.

In FIG. 1, a computer main body 10 comprises a central processing unit (CPU) 11, an input/output process control section 12, a program monitor section 13 for monitoring an executing position of a program prepared by a user, an interrupt control section 14, a resource monitor section 15 for monitoring a value of a used resource, a main memory 16 comprising a semiconductor memory (e.g., ROM, a RAM, or the like), general-purpose and arithmetic registers ("GR") 17, and the like.

The above-mentioned main body 10 is connected to various input and output devices, and various external memory devices 30 and 40 via the input/output process control section 12 in the main body.

A plurality of terminals 22 are connected to a terminal controller 21 connected to the output unit of the section 12. A card reader 23 and a printer 24 are connected to the input/output process control section 12. The external memory devices 30 including a semiconductor memory 31, a magnetic disk 32, a magnetic tape 33, an optical disk 34, and the like are directly connected to the input/output process control section 12. On the other hand, the external memory devices 40 include a plurality of storage media having different access speeds, and include, e.g., a semiconductor memory 41, a magnetic disk 42, and a magnetic tape 43. These memory devices 40 are connected to the above-mentioned input/output process control section 12 via a section which performs a characteristic operation of the present invention, i.e., an "automatic file migration controller (AFMC)" 50. The AFMC 50 is controlled by a software program operated in a predetermined procedure, and controls various storage media (e.g., 41, 42, and 43) described above. More specifically, the AFMC 50 migrates contents of a job interrupted halfway, which are dumped from the resources (e.g., the main memory, various registers, and the like) of the computer main body 10 to the storage media in the order of higher access speeds, e.g., in the order of the semiconductor memory 41→the magnetic disk 42→the magnetic tape 43 when a predetermined condition (to be described later) is established In the description of this embodiment, the CPU time as one of resources will be mainly explained. However, similar embodiments can be constituted for other resources (e.g., a memory capacity, a memory space, and the like). For many users, a resource which is most easily exhausted is the CPU time (for example, the CPU time is wasted by a permanent loop). Therefore, the system arrangement for the CPU time will be described in detail below.

In order to observe this resource, i.e., the CPU time, a means for always monitoring the CPU times in units of jobs is required. A normal computer comprises internal timers, and monitors time consumed in each execution step of each job in terms of job management. Therefore, new monitoring means need not be arranged as hardware in order to realize the present invention, and monitoring processing is executed using these internal timers by software (control program) which is operated in accordance with a predetermined judgment criterion.

In the computer system with the above arrangement, for example, the OS is assumed to measure the CPU time of a job used while processing a given user program. At a certain point, assume that the measured time approaches a preset value (i.e., the upper limit value of resource utilization). More specifically, assuming that the job uses up to 95% of the maximum time which can be used by the CPU, data obtained up to this point are full-dumped (i.e., data associated with this program are output to a predetermined storage medium) to prepare for re-execution (to be described later) from an interrupted point of this job. In this dumped content, all the data such as the contents and addresses of various registers corresponding to variables in use, the contents and addresses of a program status word (PSW), and locations indicated by various pointers, a load module in execution, and the like are saved.

Most current computers normally execute parallel processing of a plurality of jobs by a "multi-task" system, and a "task switching" operation itself is always frequently performed. The procedure of the task switching operation shown in FIG. 2 will be briefly described below. When an interruption to the OS occurs during execution of a task-A in FIG. 2, activation transits to an interrupt processing routine, and a task-B is selected as an object to be processed. After a restart routine is performed, the task-B is executed. When an interruption to the OS occurs during execution of the task-B, activation similarly transits to the interrupt control routine, and the task-A is selected as an object to be processed. After a restart routine is performed, the task-A is executed.

Figure 2:
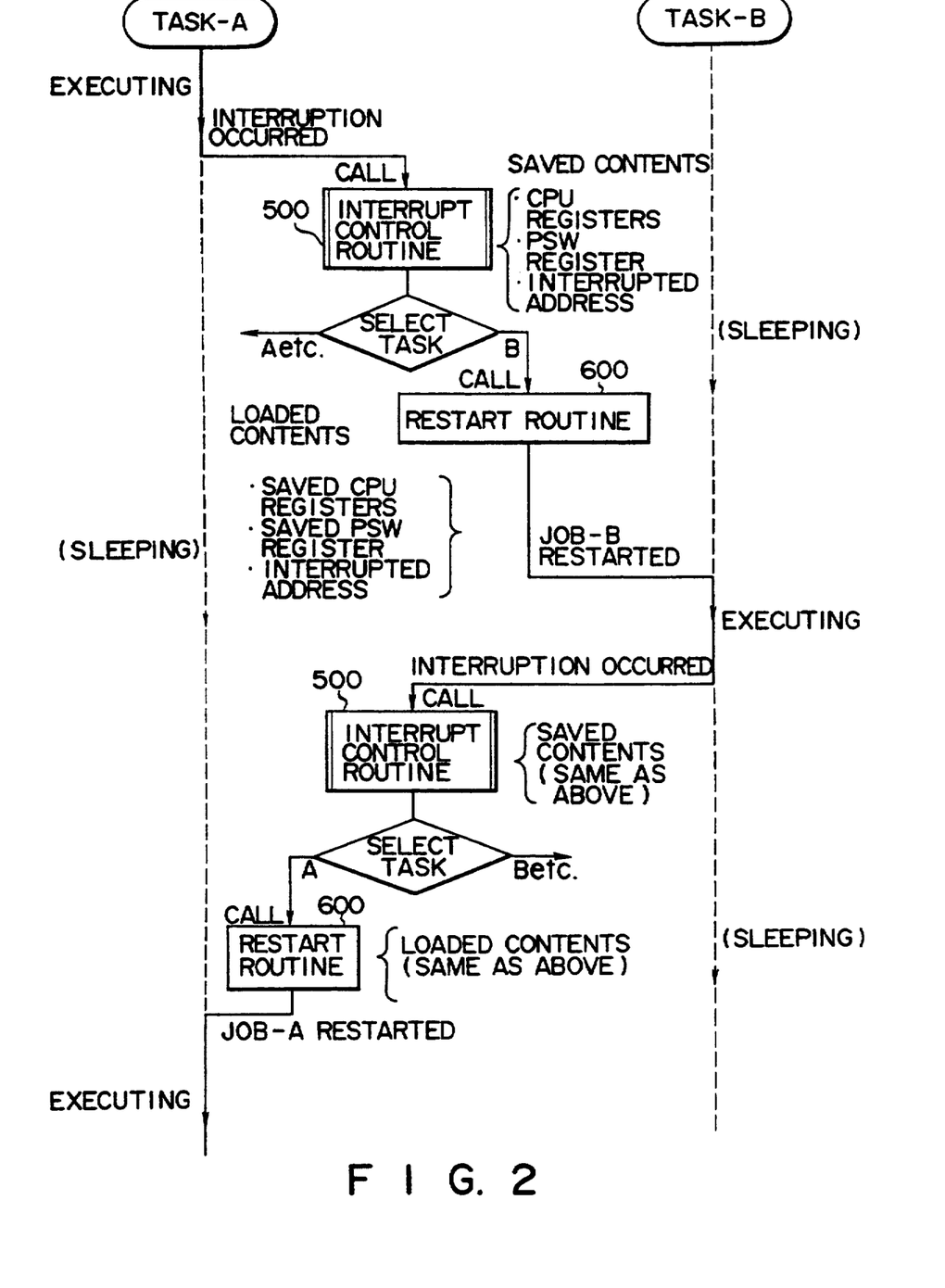
FIG. 2 is an explanatory view showing a "task switching" operation executed by the OS, a "job re-execution" timing, and data saved/loaded at that time.

In general, in a computer, arithmetic processing itself is processed within the shortest period of time. However, as compared to this, an access (I/O) to a memory area requires considerable time. Since various monitoring tasks and system check tasks are present, when these tasks use the CPU 11, the task switching operation is necessary. Task switching is caused by "event driven", and "time-sharing" operations. In the former case, a direct interruption command (e.g., a supervisor call interruption (SVC)) is input, while in the latter case, an instruction request is issued once to the OS. In either of the above-mentioned task switching operations, processing activation transits to the interrupt control routine 500 (i.e., this routine is called), and contents and addresses of registers and PSW registers (i.e., the general purpose and arithmetic registers GR 17) used by the CPU during execution are saved. Subsequently, another task (task-B) is selected according to a given criterion, the content of the PSW in the GR 17 corresponding to this task-B is loaded, and the processing is restarted.

The procedure in the CPU of the computer has the above-mentioned flow for one job. Of course, although hardware is manufactured to realize this operation, another task selected after task switching is similarly processed by the same hardware. In normal task switching, the saved content is normally resident in the main memory. This is to switch tasks at high speed. However, when the main memory capacity does not have a sufficient margin, the saved content is temporarily written in an external memory device and an auxiliary memory device. In this manner, an operation for temporarily dumping data from the main memory area is called a "swap out" operation, and an area used in this operation is called a "swap area". The swap area is assured in a storage medium (e.g., a RAM) which can be accessed at high speed in a hardware manner, and the size of this area is not infinite.

Therefore, the swap area size determines the upper limit of the number of tasks which can be subjected to parallel processing. Due to the presence of this limit, many jobs are placed in a queue before execution in response to, e.g., a SYSIN-QUEUE command in the JCL, and must wait for an execution order. When the CPU time is used up, and data are dumped, the same state as described above may occur in view of a procedure. However, in the "task switching" operation utilized by the present invention, an incomplete job can be automatically re-executed. In this case, when a resource is used up, whether or not the job is to be re-executed, or an execution timing of the job is determined according to an instruction from a user or an operator.

In order to eliminate excessive "swap-in" and "swap-out" times upon task switching, a storage medium used for assuring the swap area employs a storage medium having a particularly short access time, e.g., a "semiconductor memory element" (for example, a bipolar element capable of performing a high-speed operation). However, since a memory element of this type is expensive and requires a large power consumption, it is technically difficult and uneconomical to mount a large number of these memory elements. Despite these disadvantages, this memory element is the most preferable storage medium in this embodiment. In practice, however, a RAM board, or the like may be used.

The reason why a resource is limited in the job control language specification of the computer is to prevent wasteful calculations due to an error in a user program, and to prevent an endless loop due to a coding miss of a programmer, rather than that the priority order of processing of a job requiring a large resource is lowered so as to schedule jobs, so that jobs can be efficiently processed as a whole. When a job under the above-mentioned circumstance is full-dumped on a high-speed semiconductor memory device upon interruption, such an operation contradicts with effective utilization of a storage medium. Furthermore, in general, an execution type program is often a considerably large-size load module, and especially in scientific and technical calculations, large-scale matrix calculations and numerical integrations are performed. In this case, a load module scale is extremely large. For example, if 1,000×1,000 matrix elements are defined, 1 megaword is required for storing only these elements.

Therefore, if all these data are full-dumped, the memory area becomes short soon even in a computer having a large storage medium. If the data are not re-utilized after they are saved, this dump operation is quite wasteful in operation. Furthermore, since data are dumped to be re-executed, no problem is posed even if a memory device requires a relatively long access time. However, although no problem is posed even if a relatively long read time is required upon re-execution, a storage medium which requires a long access time upon interruption of a job frequently causes the CPU to wait for I/O accesses (i.e., the CPU waits without any processing until the storage medium is ready to access), thus wasting the CPU time.

In order to prevent such a situation, in this embodiment, a plurality of external memory devices having different access times are prepared as follows. More specifically, as a direct swap-out destination of the CPU, a high-speed storage medium (e.g., a semiconductor memory device, etc.) which does not require a long access time is used. Simultaneously with this full-dump operation, a job itself is terminated, and, e.g., a message indicating that a full-dump operation is performed is informed to a user.

When no restart request is issued within a predetermined period of time, the dumped file is migrated to a storage medium requiring a longer access time (e.g., a magnetic disk device, etc.). Since migration from the high-speed storage medium to a storage medium having a longer access time than the high-speed medium can be performed without going through the CPU, even if the access time is long, the CPU can be prevented from being kept in a wait state after it issues an I/O request due to the migration. Furthermore, when a user inputs neither a restart nor a delete instruction within a predetermined period of time, the dumped file can be migrated to a storage medium requiring a still longer access time (e.g., a magnetic tape device, etc.). From the above explanation, it can be gained that migration of a file in the present writing means that a file is moved from one storage device to another storage device with a slower access time than the access time of the one storage device, after a predetermined event (or failure of an event to occur). It can also be gained that migration processing is the processing performed during the migration of a file.

The memory devices of this embodiment can be arranged by access times in the order of the semiconductor memory, the magnetic disk, and the magnetic tape. This order is equal to the order based on cost per bit, and the order based on power consumption. In view of the memory capacity, the above-mentioned order represents that from a small-scale device to a large-scale device. For example, in the case of the magnetic tape, since a mass storage system (MSS) which can automatically mount/unmount tapes has already been commercially available, if this magnetic tape is used, an infinite memory capacity can be provided in practice.

A resource is often used up due to erroneous use of a user in practice, and the user may notice this error before re-execution. In this case, no problem is posed as long as the user reliably deletes the dumped file. However, in a practical operation, the file is often left undeleted. In this embodiment, like in a control method about an output queue of a general-purpose large-scale computer, control for automatically deleting an unused dumped file which can be re-executed after it is saved for a predetermined period of time is performed. Since delete operation can be performed independently of access time of the memory device (e.g., by batch processing), the CPU which is operating for another job is not interrupted, and the operating efficiency of the overall computer will not be decreased.

A computer system comprising a hierarchical storage medium arrangement as a device for saving permanent user files has already been available. In this case, this device can be implemented in hardware. However, since the present invention provides two utilization methods, i.e., a normal utilization method wherein files are accessed according to a user's request, and a utilization method wherein files are accessed according to a request from the OS when the computer resources are exhausted, a plurality of semiconductor memory devices (e.g., RAMs) directly connected to the CPU are arranged to be able to perform multi-port access. If the multi-port access cannot be performed, when arbitration of the rights of access is required among the memory devices, the CPU itself must be kept in a wait state without any processing until the right of access is acquired.

Figure 3:
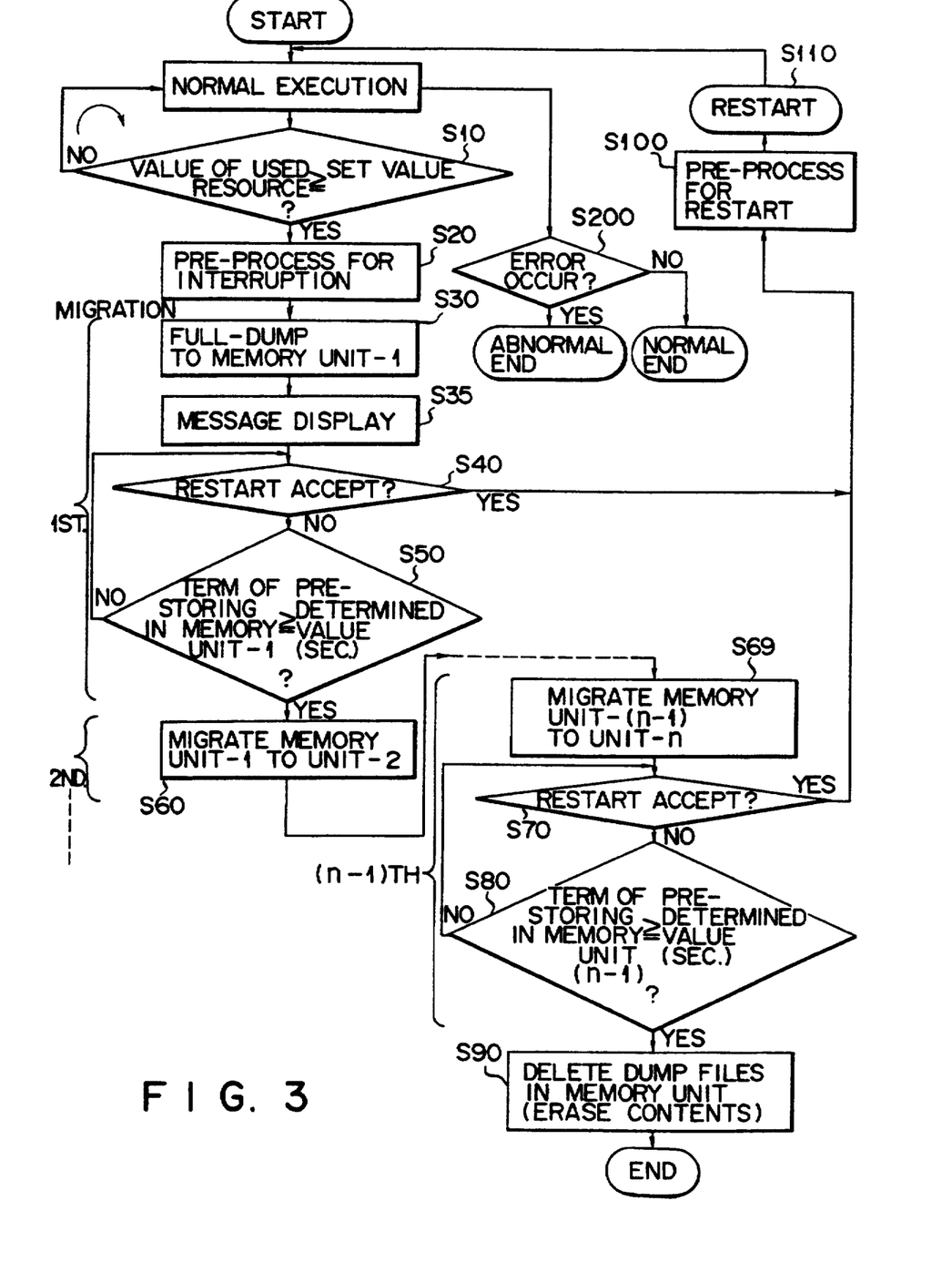
FIG. 3 is a flow chart for controlling a basic operation of "file migration processing" among a plurality of storage media executed by the OS of the present invention during the "task switching" operation.

Basic control and operations of the computer system described above will be described below with reference to the flow chart shown in FIG. 3.

A series of control operations are executed by the following steps.

(s10): In normal execution, the system always compares a value of a used resource with a value set in advance by a user to check if the present value has reached the set value.

(s20): If the value of the used resource has reached the set value, the system executes the above-mentioned pre-processing for interruption.

(s30): The system full-dumps contents of a load module, all the registers, and the status word register to a memory unit 1 (e.g., the semiconductor memory 41 in this embodiment).

(s35): At the same time, the system temporarily terminates processing, and informs to a user a message indicating that the resource is short.

(s40): It is checked if an issued instruction is a re-execution instruction of the temporarily terminated processing.

(s100): If it is determined that the re-execution instruction is issued, the system executes the above-mentioned pre-processing for a restart operation.

(s110): The processing is restarted, and the flow returns to normal execution.

(s50): It is checked if a predetermined period of time a term for which the contents are stored in the memory unit 1 reaches a predetermined value) has elapsed without detecting the re-execution instruction issued from a user. If it is determined that the predetermined period of time has not elapsed, the flow returns to step (s40).

(s60): If no re-execution instruction is issued within the predetermined period of time, the content of the memory unit 1 is migrated to a memory unit 2 (the magnetic disk 42 in this embodiment). Thus, the dumped content is migrated in turn to storage media having longer access times.

(s61): In each of memory units 2 to N, it is checked like in steps (s40), (s50), and (s60) if the predetermined period of time has elapsed without detecting the re-execution instruction from a user. If it is determined that the predetermined period of time has not elapsed yet, the flow returns to the re-execution instruction judgment step.

(s69): The dumped content is migrated to the last memory unit N (the magnetic tape 43 in this embodiment).

(s70): Thereafter, it is checked if an instruction issued before a term for which the contents are stored in the corresponding memory unit reaches a predetermined period of time is the re-execution instruction of the temporarily terminated processing like in the memory unit 1. If it is determined that the re-execution instruction is issued, the pre-processing for start (s100) is executed, and the processing is then restarted (s110). The flow then returns to normal execution.

(s80): If no re-execution instruction is issued from a user, it is checked if a predetermined period of time has elapsed. If the predetermined period of time has not elapsed yet, the flow returns to the re-execution instruction judgment step (s70).

(S90): If no re-execution instruction is detected within predetermined period of time, the file is deleted according to a predetermined procedure, and thereafter, a series of processing operations are ended.

In the above description, the "CPU time" has been exemplified as a resource. However, substantially the same procedure is performed for other resources (e.g., a memory capacity, a memory space, etc.). A case will be briefly described below wherein the "memory capacity" is the resource.

When the memory capacity is a resource, the following two cases must be taken into consideration. That is, a first case is a case wherein the memory area is a "main memory" area, and the second case is case wherein the memory area is an "external memory" device. In the former case, since existing computers employ a "virtual memory system" except for some computers (in particular, super computers), the main memory area is basically independent from a physical memory (i.e. real memory space). However, a job which requires a wide main memory area beyond the performance of the virtual memory system having a virtual storage access method cannot be basically processed. In this case, the addressing method of the memory space must be drastically improved, and this means a change in overall architecture. Thus, such a case will disregarded here.

On the other hand, in the latter case, especially, a sequentially searched file is written according to a write request every time the write request is issued. When the resource is used up, control data indicating normal termination of file write access (i.e., end of file: EOF) is additionally written, and write access to the external memory device is temporarily stopped. In this state, since the resource (e.g. the storage area) is used up, a user definition program and the contents of registers and the PSW in use are dumped (output), and the dumped content is stored in a memory device to prepare for a restart operation. The reason why the EOF mark is written at the end of the storage medium which has been subjected to write access is to allow easy recognition of the last written data after the restart operation.

When a restart request is issued, a program is loaded, and data in registers are re-loaded according to an interrupted point. Since processing in response to a write request has been interrupted so far, the program counter (e.g. pointer) must indicate an execution point of, e.g., a WRITE statement in the FORTRAN language. When data is to be added to the same file, a file to be opened independently of the program counter position is selected from the external memory device, and a location where the corresponding data is to be added is searched. Then, the pointer is moved by "skipping (i.e. moving the pointer)" to the EOF mark of the data. The position of the pointer is determined to read data backward by one record, so that another data can be overwritten on the EOF record which was written last. The processing so far is pre-processing for re-executing a job from the interrupted point. Thereafter, the control returns to normal execution, and the processing is executed according to indication of the program counter.

In this embodiment, the above-mentioned operation is performed under the precondition that a user recognizes that a previously requested file has a short capacity when a job is interrupted, and sets a so-called "permanent file" to have a proper size.

A method of automatically performing the above-mentioned operation on the system side is also available. For example, when a user inputs a restart request, a computer writes data from the interrupted point to a temporary file different from a file subjected to write access before interruption. If a file (e.g. data area) becomes full up, a message indicating this must be displayed (output). However, assume that a series of processing operations are normally terminated. As a result, since two files which are originally a single file are created, an operation for concatenating these files is required finally. Such a "file concatenation" function is one of utilities normally provided by a conventional OS. Therefore, as long as a file name is saved, the concatenation operation can be easily realized. Thus, a user need only input a restart request, so that the system can automatically perform the above-mentioned operation by utilizing the existing utility. However, in this case, post processing, i.e., file concatenation is required.

A file which is full-dumped to prepare for re-execution is stored first in a storage medium (e.g., a RAM) capable of performing high-speed access. However, when a user does not issue an instruction within a predetermined period of time, the file is automatically migrated to a storage medium (e.g., a magnetic disk) having a longer access time. The file is also held on the last storage medium for a predetermined period of time. However, if no instruction such as a re-execution instruction is issued within this period, the corresponding file is deleted. The above-mentioned method is the same as in a case wherein the "CPU occupation time" is set as one of resources.

As described above, according to this embodiment, even when a preset resource (e.g., a memory area, CPU occupation time, etc.) is used up, a job can be re-executed from an interrupted point. In a conventional system, when a resource is used up, the system is abnormally terminated (ABORTed), and a calculation (processing) must be restarted from the beginning. However, in the embodiment of the present invention, the calculation (processing) can be continued by utilizing an intermediate calculation result (intermediate processing result). Furthermore, although the resource is not substantially limited, processing can be easily performed in "small units", and unnecessarily large jobs can be eliminated.

For a user, processing time required for a recalculation can be greatly shortened, and debugging operation efficiency can be improved. Therefore, utilization efficiency of a computer can be greatly improved.

Note that the present invention is not limited to the above embodiment. A resource is not limited to the CPU time, and an external memory device, and other resources may be used. As described in the above embodiment, some resources require proper pre-processing and post processing so as to re-execute a job from an interrupted point. The detailed procedure depends on the type of resource, and cannot be uniquely defined. However, such a procedure can be a modification of the present invention as long as an OS aims at re-executing a job from an interrupted point when a resource is exhausted, and performs an operation to prepare for the re-execution. The arrangement of the computer system is not limited to that shown in FIG. 1, and may be properly modified according to specifications. Various changes and modifications may be made without departing from the spirit and scope of the invention.

As described in detail above, the OS of the computer of the present invention does not abnormally terminate a job to interrupt its execution at an instance when a resource of the computer is used up during an operation. The OS of the present invention has a degree of freedom in operation, i.e., can ask for a user's instruction by inquiring about a processing decision to the user after an abnormality occurs. Therefore, even after a preset resource is used up, a job can be re-executed from an interrupted point. For this reason, wasteful processing time required for a re-calculation which is executed from the beginning can be eliminated, and utilization efficiency of the computer itself can be improved.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An operating system for a computer, which compiles a program prepared by a user, then links predetermined modules to create a load module, and executes the load module as a job, which comprises:
    program monitoring means for monitoring a present execution position of a statement of the user program and outputting program monitoring results;
    used resource quantity monitoring means for monitoring quantities of used resources controlled by said operating system and outputting used resource quantity results; and
    execution means for executing the user program and a control program for judging, based on the program monitoring results from said program monitoring means and the used resource quantity results output by the used resource quantity monitoring means, whether the quantity of a presently used resource approaches a quantity corresponding to a limiting threshold or exceeds the limiting threshold;
    wherein when said execution means determines that the quantity of the used resource approaches the limiting threshold or has exceeded the limiting threshold, said operating system dumps the contents of the load module, all registers, and a status word register associated with the job of the user program to a predetermined external memory device, and temporarily interrupts the job processing;
    said operating system further comprises means for, when it is determined that the quantity of the used resource approaches the quantity corresponding to the limiting threshold or has exceeded the limiting threshold, informing to the user a message indicating that "a resource is too small to execute the user program", and
    when the user inputs a re-execution instruction from predetermined instruction input means, said operating system reloads the dumped contents to said execution means, and causes said execution means to re-execute the job from an interrupted point of the user program.

2. An operating system according to claim 1, wherein said resources include external memory devices of said computer, said external memory devices including:
    a first memory device group, connected to the execution means, including a plurality of storage media having different access speeds, and
    a second memory device group comprising a plurality of storage media having different access speeds,
    means for performing a migration processing, connected to the execution means and second memory device group, using the storage media of the second memory device group.

3. An operating system according to claim 1, wherein said resources include an occupation time of an arithmetic processing unit of said computer,
    the occupation time representing a maximum time which can be continuously occupied by each job to execute processing of the job.

4. An operating system according to claim 1, wherein said resources include a main memory device of said computer other than a "virtual memory system",
    the main memory device representing an area which is exclusively used by a user, and has a predetermined capacity to be occupied by each job.

5. An operating system for a computer, which compiles a program prepared by a user, then links predetermined modules to create a load module, and executes the load module, which comprises:
    program monitoring means for monitoring a present execution position of a statement of the user program and outputting program monitoring results;
    used resource quantity monitoring means for monitoring quantities of used resources controlled by said operating system and outputting used resource quantity results; and
    execution means for executing the user program and a control program for judging, based on the program monitoring results from said program monitoring means and the used resource quantity results output by the used resource quantity monitoring means, whether the quantity of a presently used resource approaches a quantity corresponding to a limiting threshold or exceeds the limiting threshold;
    wherein when said execution means determines that the quantity of the used resource approaches the limiting threshold or has exceeded the limiting threshold, said operating system dumps the contents of the load module, all registers, and a status word register associated with the job of the user program to a predetermined external memory device, and temporarily interrupts the job processing,
    said operating system further comprises means for, when said execution means judges that the quantity of the used resource approaches the quantity corresponding to the limiting threshold or has exceeded the limiting threshold, informing to the user a message indicating that "a resource is too small to execute the user program", and
    when the user inputs a re-execution instruction, said operating system reloads the dumped contents to said execution means, and causes said execution means to re-execute the job from an interrupted point of the user program,
    wherein at least two external storage media are provided, and when the contents of the load module, all the registers, and the status word register are dumped, all of the contents are dumped to the storage medium having the shortest access time, and said operating system further comprises assignation means for, when no re-execution instruction according to the predetermined procedure is input after an elapse of a predetermined period of time, assigning the dumped contents to the storage medium having the second shortest storage medium, and for, when no re-execution instruction according to the predetermined procedure is input after an elapse of another predetermined period of time, sequentially migrating the dumped contents to the storage media having longer access times.

6. A method of controlling a computer by an operating system, comprising the steps of:

a used resource value comparison/judgment step of comparing a quantity of a resource used by a job with set quantities associated with resources which can be used and set in advance by a user when the job is normally executed, and judging whether a present quantity of the used resource has reached the set quantity;

an interruption pre-processing step of preparing for an interruption temporarily occurring in the job if the quantity of the used resource has reached the set value;

a dump processing step of dumping all contents of an executable program module, all registers, and a status word register to a first memory unit;

an information step of temporarily interrupting processing associated with the job by calling an interruption routine, and informing to a user a message indicating that the quantity of the resource is insufficient to complete the job;

a re-execution instruction determining step of determining if an instruction issued by the user is a re-execution instruction associated with the temporarily interrupted job processing;

a restart pre-processing step of executing pre-processing for restarting the interrupted job if the re-execution instruction determining step determines that the instruction issued by the user is the re-execution instruction;

a restart step of restarting the job in a normal execution state;

a first elapse time judging step of judging if a predetermined period of time has elapsed during which the contents are stored in said first memory unit without detecting the re-execution instruction from the user, and returning activation to the re-execution instruction determining step when the predetermined period of time has not elapsed;

an (N−1)th migration processing step of sequentially migrating the dumped contents to memory units having longer access times by migrating the content of an (N−1)th memory unit (N is an integer not less than 2) to an Nth memory unit when no re-execution instruction is issued within the predetermined period of time, and when a predetermined condition is satisfied thereafter;

an Nth elapse time judgment step of causing each Nth memory unit to check if the predetermined period of time has elapsed without detecting the re-execution instruction issued from the user, returning activation to the step immediately after the corresponding migration processing step when it is determined that the predetermined period of time has not elapsed, and executing the re-execution pre-processing step and the restart processing step in turn, and returning activation to normal execution when it is determined that the re-execution instruction is issued; and a deleting step of deleting associated dumped files stored in all the memory units used in all the migration processing steps in accordance with a predetermined procedure, an ending a series of task processing operations when no re-execution instruction is issued within the predetermined period of time.

7. A method according to claim 6, wherein resources of a plurality of external storage media include external memory devices of the computer, and the (N−1)th migration processing step includes a step of assigning storage media as objects of migration to be sequentially executed in the order of higher access speeds, the step of assigning the storage media including the steps of:

assigning a semiconductor memory as the storage medium of a first memory unit;

assigning a magnetic disk as the storage medium of a second memory unit;

assigning a magnetic tape as the storage medium of a third memory unit; and assigning an optical disk as the storage medium of a fourth memory unit.

8. A method according to claim 6, wherein said resources include an occupation time of an arithmetic processing unit of a computer, the occupation time representing a maximum occupation time which can be continuously occupied by each job to execute processing of the job.

9. A method according to claim 6, wherein said resources include an occupation capacity of a main memory device of said computer other than a "virtual memory system", the occupation capacity representing a capacity of an area which is exclusively used by a user, and can be occupied by each job.

10. A method according to claim 6, wherein said resources include an occupation time of an arithmetic processing unit of a computer, the occupation time representing a maximum occupation time of said CPU which can be continuously or totally occupied by each job to execute processing of the job.

11. A method according to claim 6, wherein the interruption pre-processing step includes:

a step of additionally writing a predetermined control code indicating that a processed data write operation in a file to be used allocated in a predetermined external memory device is normally performed and finished when it is confirmed that the resource is used up, and temporarily stopping write processing to said external memory device; and a step of temporarily swapping the module of the executable program, and contents of registers and a PSW (Program Status Word) used in execution of the program in a predetermined memory unit to prepare for the following restart operation.

12. A method according to claim 6, wherein the interruption pre-processing step includes:

a step of writing processed data from an interrupted point in a temporary file different from a current file used in a normal execution state; and a step of displaying and outputting an alarm message on predetermined display means when a write area of the temporary file becomes full during write processing, and informing an operator of a present state of the computer using the message.

13. A method according to claim 6, wherein the restart pre-processing step includes as pre-processing for re-executing a job from an interrupted point:
- a step of loading the user program and re-loading data in registers according to the interrupted point when a restart operation of the job is requested;
- a step of resetting a content of a program counter indicating an execution point of a statement of the program whose processing has been interrupted in a current program counter;
- a step of selecting an opened file from an external storage device, searching a location where corresponding data is to be appended in the selected file, and appending the data in the selected file;
- a step of moving the program counter by skipping corresponding data processing to an end of file code of the data; and
- a step of reading data backward by one record to determine a position of the pointer so that data can be overwritten on a finally written EOF record.

14. A method according to claim 6, further comprising:
- a file concatenation operation step of activating a utility supplied by said operating system as post processing when the series of task processing operations are normally terminated, and concatenating a plurality of created files to each other by designating a saved file name in advance.

15. A method according to claim 6, wherein:
the file is set in advance to have a sufficient size as a "permanent file", and a processing operation comprising the above-mentioned steps is executed without input by a user.

16. A computer system, comprising:
- execution means for executing computer system instructions of a program and using a resource of the computer system as the instructions are being executed;
- monitoring means, connected to the execution means, for monitoring a quantity of the resource used by said execution means and outputting a monitoring result which indicates that the use of said resource has at least one of reached and exceeded a limiting threshold;
- interrupt means, connected to the monitoring means and the execution means, for interrupting execution of said instructions when said monitoring means outputs the monitoring result which indicates that the use of said resource has at least one of reached and exceeded a limiting threshold;
- save means, connected to the execution means, for saving data associated with the executing instructions in a first save area when said monitoring means outputs the monitoring result which indicates that the use of said resource has at least one of reached and exceeded a limiting threshold;
- moving means, connected to the save means, for moving the data saved by said save means from the first save area to a second save area after an occurrence of a predetermined condition;
- input means for inputting, after the execution of the instructions was interrupted, a command from a user which indicates that execution of said computer system instructions is to be restarted;
- restart means, connected to the first and second save areas and the input means, for restarting execution of said computer system instructions by loading the saved data to a location in said computer system where said saved data is used to continue executing the interrupted computer instructions.

17. A computer system according to claim 16, wherein the second save area has a slower access time than an access time of the first save area.

18. A computer system according to claim 17, wherein said predetermined condition which causes the moving means to move the saved data from the first save area to the second save area is an elapse of a predetermined period of time without input from a user which indicates that execution of said instructions is to continue.

* * * * *